June 11, 1963 D. E. CASE 3,093,761
VIBRATORY ELECTRIC MOTOR
Filed Jan. 24, 1961

INVENTOR.
DELBERT E. CASE,
BY
McMorrow, Berman & Davidson
ATTORNEYS.

ated June 11, 1963

3,093,761
VIBRATORY ELECTRIC MOTOR
Delbert E. Case, P.O. Box 127, Kenwood, Calif.
Filed Jan. 24, 1961, Ser. No. 84,654
1 Claim. (Cl. 310—28)

This invention relates to systems and apparatus for protecting lawn and garden areas from vermin, such as gophers, moles, and similar rodents, and more particularly to a method and means for applying vibrations to lawn and garden areas in a manner to eliminate such vermin.

A main object of the invention is to provide a novel and improved method and means for protecting lawn and garden areas, the method being relatively simple to carry out, involving inexpensive apparatus, and being highly effective in excluding vermin such as gophers, moles, and similar rodents from lawns and garden areas.

A further object of the invention is to provide an improved apparatus for applying vibrations to lawn and garden areas for the purpose of eliminating vermin such as gophers, moles and the like from such areas, the device being relatively inexpensive to manufacture, being durable in construction, and requiring a minimum amount of human supervision.

Further objects and advantages of the invention will become apparent from the following description and claims, and from the accompanying drawings, wherein:

Figure 1:
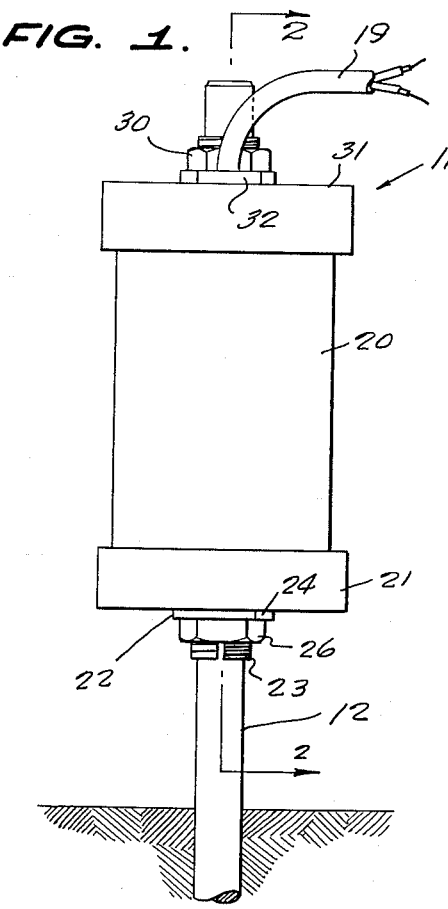
FIGURE 1 is a fragmentary side elevational view of a vibrator assembly which is used in carrying out the improved method of the present invention.

Referring to the drawings, 11 generally designates a typical vibrator assembly which may be employed in carrying out the method of the present invention, namely, for generating and transmitting vibrations to the soil in a lawn or garden area to be protected from vermin. The device 11 comprises a suitable transmission element, for example, a rigid stake member 12 adapted to be driven into the ground in the area to be protected, said stake member being preferably of metal or similar rigid material through which longitudinal vibrations readily pass.

Figure 2:
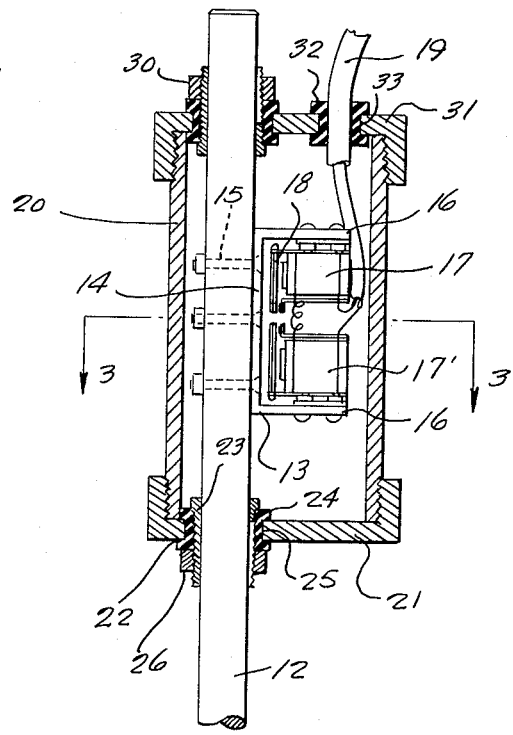
FIGURE 2 is a vertical cross sectional view taken substantially on the line 2—2 of FIGURE 1.
Figure 3:
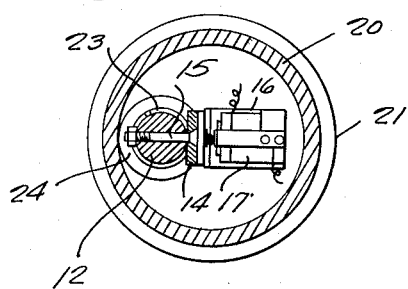
FIGURE 3 is a horizontal cross sectional view taken substantially on the line 3—3 of FIGURE 2.

Rigidly secured to the upper portion of the stake member 12 is a generally U-shaped bracket member 13, said bracket member having a straight bight portion 14 which is rigidly fastened to the stake member 12 by means of a plurality of fastening bolts 15, as shown in FIGURE 2. Thus, the arms 16, 16 of the bracket member 13 extend horizontally in the manner illustrated in FIGURE 2.

Secured rigidly to the top arm 16 and depending therefrom is a first electrical vibrator assembly 17 which includes the vibratory armature 18 adapted to vibrate with substantial amplitude and at an audible frequency when energized with alternating current. Rigidly secured to the lower arm 16 is an identical upstanding vibrator assembly 17' which is connected in series with the vibrator 17, whereby both vibrators will be simultaneously energized when connected to a source of alternating current. A suitable line cord 19 is provided which is connected to the series-connected vibrators 17 and 17', the line cord 19 being adapted to be connected to a suitable source of domestic alternating current.

The vibrator 17' is identical to the vibrator 17 and vibrates at the same frequency therewith and substantially in phase therewith, so that the armatures of said vibrators simultaneously generate audible vibrations, which are in turn transmitted through the arms 16, 16 and the bight portion 14 of bracket 13 to the transmission element 12. These vibrations are transmitted through the stake member 12 to the ground and thus serve to radiate corresponding vibrations through the ground outwardly from the stake member, said vibrations being of substantial amplitude and thus being effective over a considerable area to prevent vermin such as gophers, moles, and similar rodents, from entering the area.

A suitable protective housing is provided for the vibrator elements, said housing comprising a generally cylindrical main shell 20 surrounding the vibrator elements 17 and 17' and the supporting means therefor at the upper portion of stake member 12, the shell member being threadedly engaged in a bottom cover 21 which is sealingly secured to the stake member 12 by means of a gland assembly 22. Thus, an externally threaded sleeve 23 is provided on the stake member 12, a rubber grommet 24 surrounding the sleeve and sealingly filling a suitable aperture 25 provided in the cover 21. A gland nut 26 is threadedly engaged on the lower portion of the bushing 23, said bushing flaring upwardly so that the bushing is tightened around the stake member 12 as the nut 26 is tightened, the nut 26 simultaneously exerting pressure on the grommet 24 to tightly seal the space between the sleeve member 23 and the aperture 25.

A similar gland assembly, shown at 30, is provided between the top portion of stake member 12 and a top cover 31 threadedly engaged on the top end portion of the shell member 20.

The line cord 19 extends sealingly through a grommet 32 provided in a suitable aperture 33 formed in the top cover 31, as is clearly shown in FIGURE 2.

As previously mentioned, in using the device 11, the stake member 12 is inserted in the ground at the area to be protected, being driven tightly into the ground so that it will be effective to transmit vibrations thereto. When the vibrator elements 17, 17' are energized, vibrations are transferred from the vibrator elements through the rigid stake member 12 to the ground, said vibrations radiating outwardly over a substantial area, as previously mentioned, thus excluding vermin therefrom.

Any suitable number of vibrator assemblies 11 may be employed, depending upon the size of the area to be protected and the nature of the soil therein. Obviously, vibrations are more easily transmitted through certain soils than others, and therefore the number of vibrator assemblies required will depend upon th soil of the area to be protected. Ordinarily, in a small lawn or garden area, a single vibrator assembly 11 will be sufficient.

It will be noted that the rubber grommets 24 employed in the top and bottom cover elements 31 and 21 serve not only as moisture sealing means but also as insulation means to prevent vibrations from being transmitted from the stake member 12 to the protective housing surrounding the vibrator elements. Since the protective housing is of considerable mass, this eliminates the losses which would occur if the protective housing were vibrated along with the stake member 12. The use of the rubber grommets 24 thus provides improved efficiency and reduces the required size of the vibrator elements 17 and 17' for generating vibrations of an amplitude sufficient to protect a given lawn or garden area.

Obviously, other types of vibrators may be employed in place of the specific assembly described above employing the respective vibrator elements 17, 17'. For example, a motor driven vibrator may be employed in place of the magnetically driven vibrator elements 17, 17'.

What is claimed is:

A device for protecting lawn and garden areas from vermin comprising a vertical rigid stake member driven into the ground, said stake member being of a material capable of transmitting longitudinal vibrations, a U-shaped bracket member having vertically spaced top and bottom arms and a vertical straight bight portion, means rigidly securing said bight portion to the upper portion of the stake member with the arms thereof extending horizontally, a first vibrator assembly operatively and rigidly secured to and depending from the top arm, a second vibrator assembly operatively and rigidly secured to and upstanding from said bottom arm, said vibrator assemblies including vibratory armatures adapted to vibrate in phase with substantial amplitude and at an audible frequency when energized with alternating current, a source of alternating current, and means to connect said vibrators to said source, whereby to energize said vibrators and to generate vibrations which are transmitted from said arms through said bight portion and stake member to the ground, serving to radiate corresponding vibrations outwardly from the stake member.

References Cited in the file of this patent
UNITED STATES PATENTS

| | | |
|---|---|---|
| 1,904,955 | Schouten | Apr. 18, 1933 |
| 1,953,677 | Glover | Apr. 3, 1934 |
| 2,191,205 | Rogers | Feb. 20, 1940 |
| 2,307,104 | Bossard | Jan. 5, 1943 |
| 2,317,665 | Bredehoft | Apr. 27, 1943 |
| 2,607,164 | Fenton | Aug. 19, 1952 |

OTHER REFERENCES

Popular Mechanics, March 1938, vol. 69, No. 3.